US012791569B2

(12) United States Patent
Hayashida et al.

(10) Patent No.: US 12,791,569 B2
(45) Date of Patent: Nov. 10, 2026

(54) COMPONENT MEASUREMENT SYSTEM AND COMPONENT MEASUREMENT DEVICE

(71) Applicant: TERUMO KABUSHIKI KAISHA, Tokyo (JP)

(72) Inventors: Yuma Hayashida, Minami-Alps (JP); Takeyuki Moriuchi, Nakakoma-gun (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 431 days.

(21) Appl. No.: 18/477,819

(22) Filed: Sep. 29, 2023

(65) Prior Publication Data

US 2024/0027483 A1 Jan. 25, 2024

Related U.S. Application Data

(63) Continuation of application No. PCT/JP2022/020018, filed on May 12, 2022.

(30) Foreign Application Priority Data

Jun. 17, 2021 (JP) ................................ 2021-101064

(51) Int. Cl.
*G01N 35/00* (2006.01)
*B01L 3/00* (2006.01)

(52) U.S. Cl.
CPC ...... *G01N 35/00029* (2013.01); *B01L 3/5023* (2013.01); *B01L 2200/025* (2013.01); *B01L 2200/04* (2013.01); *B01L 2300/0825* (2013.01); *G01N 2035/00108* (2013.01)

(58) Field of Classification Search
None
See application file for complete search history.

(56) References Cited

U.S. PATENT DOCUMENTS

| | | | |
|---|---|---|---|
| 7,240,565 | B2 | 7/2007 | Eisenmann et al. |
| 2002/0114735 | A1 | 8/2002 | Markart |
| 2004/0214345 | A1 | 10/2004 | Matzinger et al. |

(Continued)

FOREIGN PATENT DOCUMENTS

| | | | |
|---|---|---|---|
| CN | 1842705 | A | 10/2006 |
| JP | 2005-522243 | A | 7/2005 |

(Continued)

OTHER PUBLICATIONS

International Search Report and Written Opinion of the International Searching Authority issued in the corresponding International Patent Application No. PCT/JP2022/020018, dated Jul. 5, 2022.

(Continued)

*Primary Examiner* — Rebecca M Giere
(74) *Attorney, Agent, or Firm* — Foley & Lardner LLP

(57) ABSTRACT

A component measurement system includes an elongated test strip with a thin plate shape having a flow path for accommodating a liquid, and a component measurement device configured to accommodate the test strip and to detect a component in the liquid. The component measurement device includes a gripping mechanism that grips the test strip while biasing the test strip from a width direction.

7 Claims, 11 Drawing Sheets

(56) References Cited

U.S. PATENT DOCUMENTS

| | | | | |
|---|---|---|---|---|
| 2005/0256382 | A1* | 11/2005 | Eisenmann | G01N 33/4875 600/309 |
| 2006/0133956 | A1* | 6/2006 | Hamanaka | B01L 9/52 422/68.1 |
| 2012/0252133 | A1* | 10/2012 | Faulkner | G01N 27/3273 422/68.1 |
| 2015/0144505 | A1* | 5/2015 | Elder | C12Q 1/006 205/777.5 |
| 2017/0212096 | A1 | 7/2017 | Hanson et al. | |
| 2017/0343504 | A1 | 11/2017 | Davies et al. | |

FOREIGN PATENT DOCUMENTS

| | | | |
|---|---|---|---|
| JP | 2005-315818 | A | 11/2005 |
| JP | 2005-331507 | A | 12/2005 |
| JP | 2006-038857 | A | 2/2006 |

OTHER PUBLICATIONS

Extended European Search Report issued in connection with EP Appl. No. 22824713.6 dated Oct. 16, 2024.

Written Opinion of the International Searching Authority issued in the corresponding International Patent Application No. PCT/JP2022/020018, dated Jul. 5, 2022 (with English translation).

Office Action issued in Chinese Appl. No. 202280014810.5 dated Jul. 8, 2026.

Search Report issued in Chinese Appl. No. 202280014810.5 dated Jul. 3, 2026.

* cited by examiner

COMPARATIVE EXAMPLE

EXAMPLE 1

EXAMPLE 2

EXAMPLE 3

FIG. 11

| | NUMBER OF SUCCESSES / NUMBER OF N |
|---|---|
| EXAMPLE 1 | 100/100 |
| EXAMPLE 2 | 100/100 |
| EXAMPLE 3 | 100/100 |

COMPONENT MEASUREMENT SYSTEM AND COMPONENT MEASUREMENT DEVICE

CROSS-REFERENCE TO RELATED APPLICATIONS

This application is a bypass continuation by PCT Application No. PCT/JP2022/020018, filed on May 12, 2022, which claims priority to Japanese Application No. JP2021-101064, filed on Jun. 17, 2021. The contents of these application are hereby incorporated by reference in their entireties.

BACKGROUND

The present disclosure relates to a component measurement system and a component measurement device used for measuring a component contained in a liquid.

A component measurement system (blood glucose meter) that measures the glucose concentration in blood is used for diabetes treatment and determination of a dose of insulin. For example, JP 2006-38857 A discloses a component measurement device using a disposable test strip. The test strip of the component measurement device has a cavity that takes in blood and a reagent that changes in color depending on the concentration of glucose in the blood taken in the cavity. The component measurement device detects a degree of coloration of the reagent in the test strip by a detector of the optical system to detect the glucose concentration in the blood.

The component measurement device disclosed in JP 2006-38857 A has a rail-shaped insertion hole that guides the test strip. This component measurement device measures the glucose concentration while gripping the test strip inserted into the rail-shaped insertion hole from the thickness direction.

SUMMARY

However, in the conventional component measurement device, positioning accuracy of the test strip is poor, and a measurement error may occur due to misalignment of the test strip. In addition, in the conventional component measurement device, a measurement portion may be deformed when the test strip is held in the component measurement device.

An object of certain embodiments of the present disclosure is to solve the above problems.

According to one aspect of the disclosure, a component measurement system includes: a test strip including a main body portion with a thin plate shape, a flow path that is formed inside the main body portion, extends from a first end portion toward an opposite second end portion in a longitudinal direction of the main body portion, and accommodates a liquid, and an introduction port provided at the first end; and a component measurement device that accommodates the test strip and detects a component in the liquid, in which the component measurement device includes: a housing having a distal portion and a proximal portion; an insertion hole that is provided inside the housing and accommodates the test strip; a measurement unit that detects a target component in the liquid in at least a part of the flow path in a state in which the test strip is completely accommodated in the insertion hole; and a positioning mechanism that maintains an insertion position of the test strip, the positioning mechanism includes a gripping mechanism that is provided between the insertion hole and the proximal portion of the housing and grips the test strip while biasing the test strip from a width direction.

According to another aspect, a component measurement device is used in a component measurement system that detects a component in a liquid using a test strip including a main body portion with a thin plate shape, a flow path that is formed inside the main body portion, extends from a first end portion toward an opposite second end portion in a longitudinal direction of the main body portion, and accommodates the liquid, and an introduction port provided at the first end. The component measurement device includes: a housing having a distal portion and a proximal portion; an insertion hole that is provided inside the housing and accommodates the test strip; a measurement unit that detects a component in the liquid in at least a part of the flow path in a state in which the test strip is completely accommodated in the insertion hole; and a positioning mechanism that maintains an insertion position of the test strip, in which the positioning mechanism includes a gripping mechanism that is provided between the insertion hole and the proximal portion of the housing and grips the test strip while biasing the test strip in a width direction.

With the component measurement system and the component measurement device according to the above aspects, measurement errors can be suppressed.

BRIEF DESCRIPTION OF THE DRAWINGS

FIG. 11 is a table showing evaluation results of discharging operations of the test strips according to Examples 1 to 3.

DETAILED DESCRIPTION

Figure 1A:
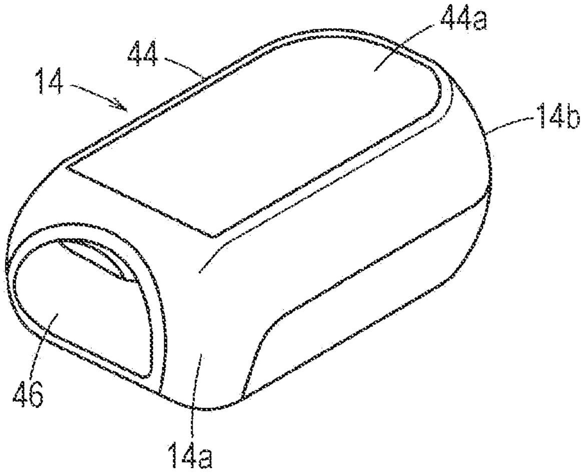
FIG. 1A is a perspective view of a component measurement device of a component measurement system according to an embodiment.
Figure 1B:
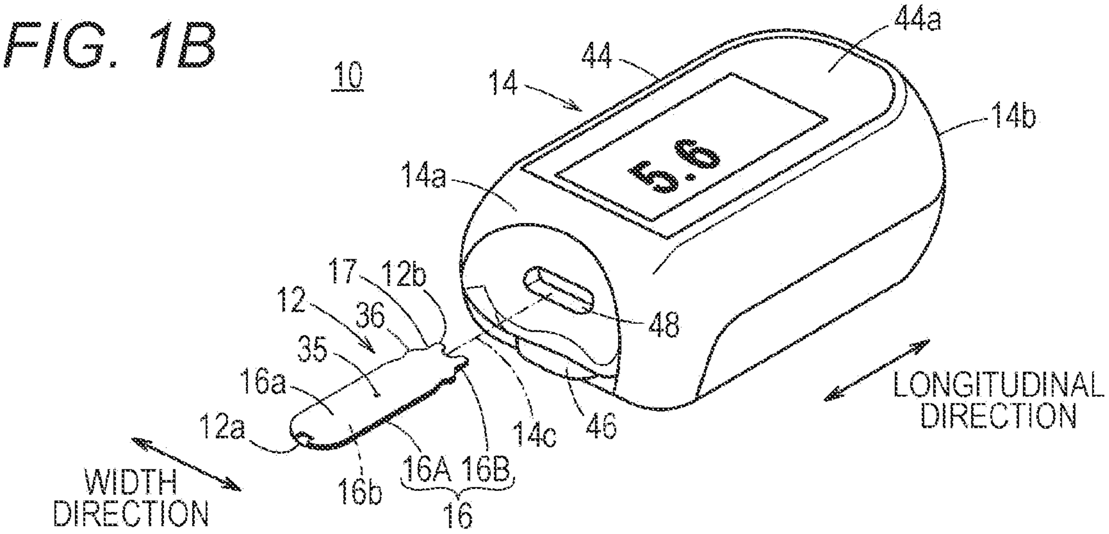
FIG. 1B is a perspective view of the component measurement system according to the embodiment.
Figure 1C:
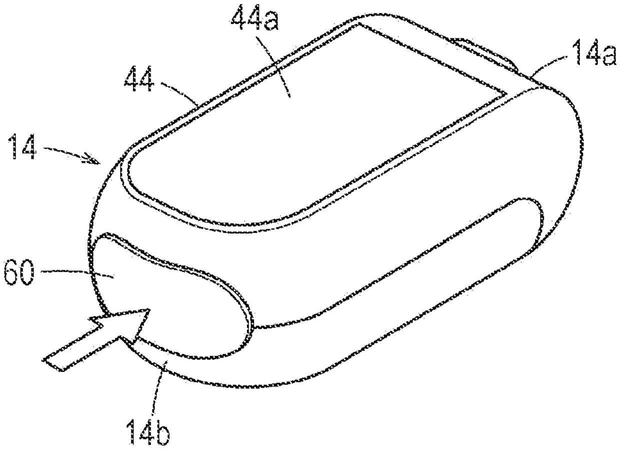
FIG. 1C is a perspective view of a proximal portion side of the component measurement device of FIG. 1A.

A component measurement system 10 according to the present embodiment illustrated in FIGS. 1A to 1C is a component measurement system for personal use operated by a user (patient). The component measurement system 10 is, for example, a blood glucose meter that measures a glucose concentration (blood glucose level) in blood. Note that the component measurement system 10 can also be used by a medical worker to measure a blood glucose level of a patient. The component measurement system 10 includes a test strip 12 and a component measurement device 14. The test strip 12 is a disposable item that is discarded per measurement. The component measurement device 14 measures a blood glucose level with the test strip 12 attached thereto. A direction in which a part of the test strip 12 is exposed from the component measurement device 14 with the test strip 12 attached to the component measurement device 14 is referred to as a distal direction. In an axial direction in which the test strip 12 is inserted, a direction opposite to the distal direction is referred to as a proximal direction.

Figure 2:
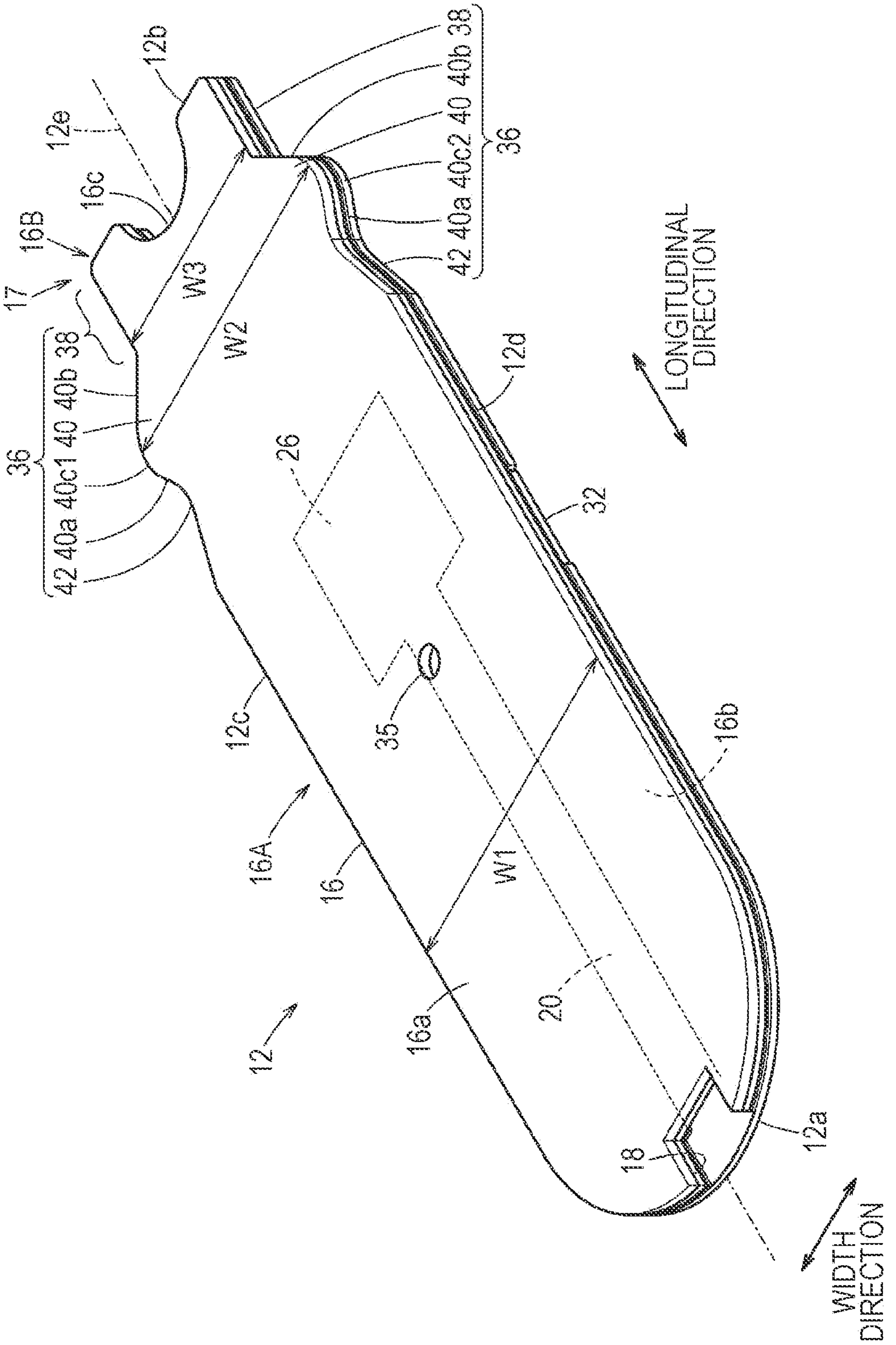
FIG. 2 is a perspective view of a test strip of FIG. 1B.

The test strip 12 has a main body portion 16 with an elongated thin plate shape. As illustrated in FIG. 2, one end of the test strip 12 in the direction of the length (longitudinal direction) has a first end portion 12*a*. The first end portion 12*a* is formed in a semicircular shape. The other end of the test strip 12 in the longitudinal direction has a second end portion 12*b*. One end of the test strip 12 in the width direction has a first side portion 12*c* extending in the longitudinal direction. The other end of the test strip 12 in the width direction has a second side portion 12*d* extending in the longitudinal direction. The first side portion 12*c* and the second side portion 12*d* are formed line-symmetrically with respect to a longitudinal center line 12*e* of the test strip 12.

The test strip 12 has the second end portion 12*b* housed in the component measurement device 14. The first end portion 12*a* of the test strip 12 protrudes to the outside (distal direction side) of the component measurement device 14 with the test strip 12 attached to the component measurement device 14.

An introduction port 18 is formed at the first end portion 12*a*. A part of a first surface 16*a* of the main body portion 16 is cut out in a rectangular shape to form the introduction port 18. The introduction port 18 is connected to a flow path 20 described later of the test strip 12. When the user places blood (sample) on the introduction port 18, the blood is introduced into the test strip 12 by capillary force.

Figure 3:
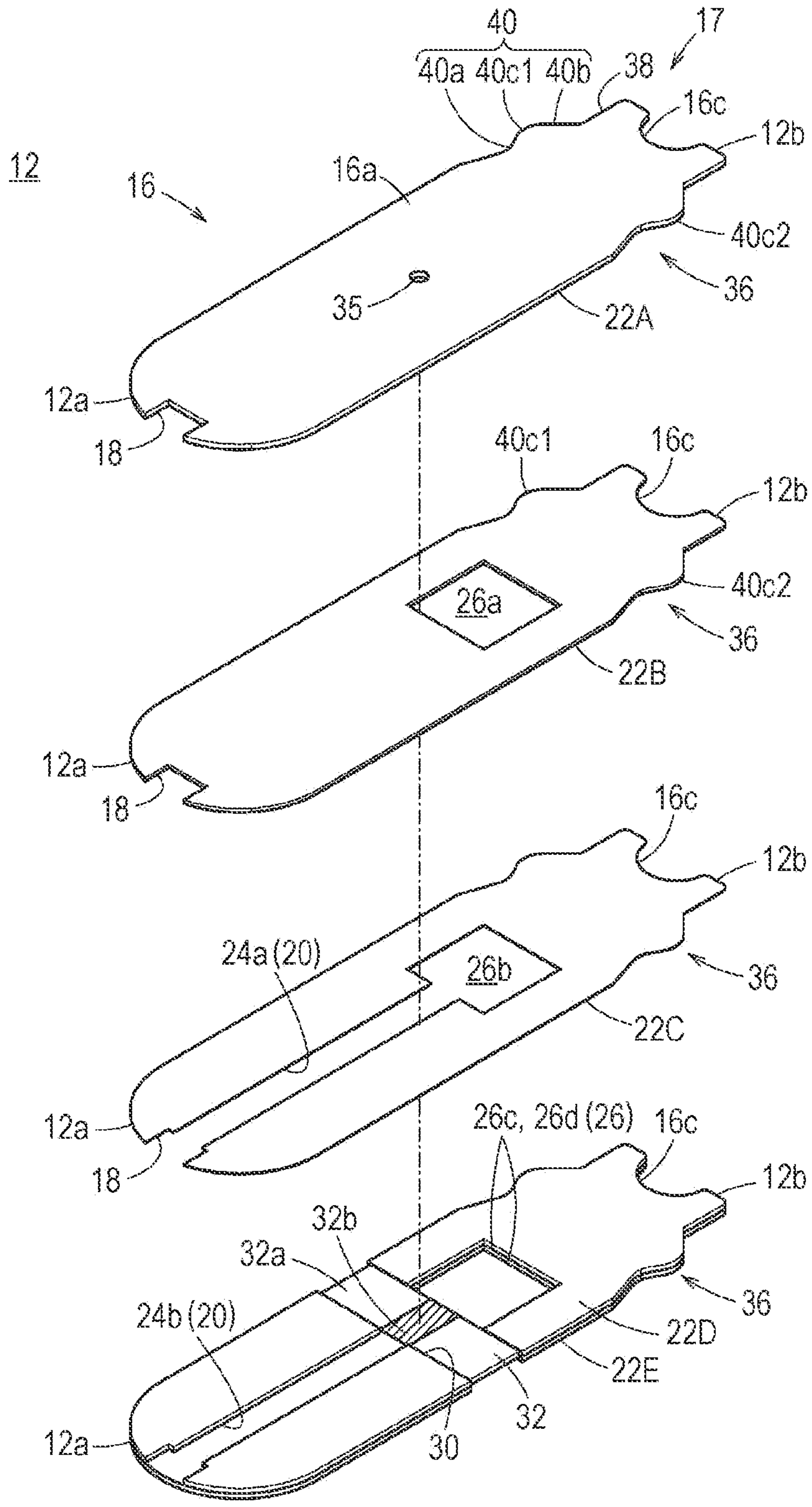
FIG. 3 is an exploded perspective view of the test strip of FIG. 1B.

As illustrated in FIG. 3, the main body portion 16 includes a first plate body 22A, a second plate body 22B, a third plate body 22C, a fourth plate body 22D, and a fifth plate body 22E. The first plate body 22A, the second plate body 22B, the third plate body 22C, the fourth plate body 22D, and the fifth plate body 22E are joined in the thickness direction via an adhesive layer such as an adhesive tape. Outer edges of the first plate body 22A to the fifth plate body 22E are formed in substantially the same shape in a plan view as viewed in the thickness direction (except for the introduction port 18). The first end portion 12*a* of each of the first plate body 22A to the fifth plate body 22E is formed in a semicircular shape. Furthermore, the second end portion 12*b* of each of the first plate body 22A to the fifth plate body 22E is formed with an arc-shaped notch 16*c*. In addition to them, the main body portion 16 includes the introduction port 18, the flow path 20, and a buffer space 26.

The first end portion 12*a* of each of the first plate body 22A to the fourth plate body 22D is formed with the introduction port 18 for taking blood into the main body portion 16. The introduction port 18 is cut out in a rectangular shape in a plan view as viewed from the thickness direction. One end of the flow path 20 communicates with the introduction port 18. The flow path 20 includes a first groove 24*a* formed in the third plate body 22C and a second groove 24*b* formed in the fourth plate body 22D. The first groove 24*a* and the second groove 24*b* extend linearly along the longitudinal direction of the test strip 12. The dimension in the width direction of each of the first groove 24*a* and the second groove 24*b* is narrower than that of the introduction port 18. The introduction port 18 of the fourth plate body 22D and the second groove 24*b* of the fourth plate body 22D are covered with the fifth plate body 22E. The fifth plate body 22E has a second surface 16*b* of the main body portion 16. The introduction port 18 and the first groove 24*a* and the second groove 24*b* form the flow path 20 by one surface covered with the second plate body 22B and the other surface covered with the fifth plate 22E. The flow path 20 transfers the blood toward the second end portion 12*b* side by capillary force.

The other end of the flow path 20 communicates with the buffer space 26. The buffer space 26 is a hollow portion having a larger dimension in the width direction than that of the flow path 20. The buffer space 26 includes a first space portion 26*a*, a second space portion 26*b*, a third space portion 26*c*, and a fourth space portion 26*d*. The first space portion 26*a* is formed in the second plate body 22B. The second space portion 26*b* is formed in the third plate body 22C. The third space portion 26*c* is formed in the fourth plate body 22D. The fourth space portion 26*d* is formed in the fifth plate body 22E. The buffer space 26 is formed by stacking the first space portion 26*a* to the fourth space portion 26*d*. The fourth space portion 26*d* opens to the second surface 16*b* of the main body portion 16.

A slit portion 30 extending in the width direction is formed in the fourth plate body 22D and the fifth plate body 22E of the main body portion 16. A reagent plate 32 made of a transparent material is fitted into the slit portion 30, and the reagent plate 32 is attached to the fourth plate body 22D. A first surface 32*a* of the reagent plate 32 forms a part of the flow path 20. The flow path 20 communicates with the buffer space 26 via the first surface 32*a* of the reagent plate 32. A reagent 32*b* is applied onto the first surface 32*a* of the reagent plate 32. When the reagent plate 32 is attached to the fourth plate body 22D, the reagent 32*b* is disposed in the flow path 20.

The reagent 32*b* is a reagent to be dissolved in blood to measure a component in the blood. The reagent 32*b* is fixed to the reagent plate 32 by being directly applied onto the first surface 32*a* of the reagent plate 32 and being dried. The reagent 32*b* causes a color reaction with glucose in blood to generate a color component. As the reagent 32*b*, for example, a mixed reagent of (i) glucose oxidase (GOD), (ii) peroxidase (POD), (iii) 1(4sulfophenyl)-2,3dimethyl-4amino-5pyrazolone, and (iv) N ethyl-N(2hydroxy-3sulfopropyl)-3,5dimethylaniline sodium salt monohydrate (MAOS) can be used. The reagent 32*b* may be a mixed reagent of glucose dehydrogenase (GDH) and a tetrazolium salt. Further, the above reagent 32*b* may contain a pH buffer such as a phosphate buffer, an appropriate mediator, and an additive. The components and types of the reagent 32*b* are not limited to the above examples.

The component measurement device 14 in FIG. 1A detects a mixture of the reagent 32*b* and blood. The component measurement device 14 irradiates the reagent plate 32 (reagent 32*b*) with measurement light having a specific wavelength in a measurement unit. The measurement unit detects the measurement light that has passed through a detection target.

As illustrated in FIG. 2, a window portion 35 through which the measurement light passes is formed in the main body portion 16. As illustrated in FIG. 3, the window portion 35 is a circular hole penetrating the first plate body 22A in the thickness direction. The window portion 35 is formed at a position overlapping the reagent 32*b* of the reagent plate 32.

Hereinafter, materials of the first plate body 22A to the fifth plate body 22E will be described. The first plate body 22A to the fifth plate body 22E are formed of a resin film using any of a PET resin, a PMMA resin, polyester, polycarbonate, polystyrene, polypropylene, an ABS resin, a COP resin, and a COC resin. Pigments are mixed with these resin films depending on the purpose. The thickness of the resin film used for each of the first plate body 22A to the fifth plate body 22E can be 20 μm to 250 μm. More preferably, the thickness of the resin film used for each of the first plate body 22A to the fifth plate body 22E can be 20 μm to 200 μm.

The first plate body 22A is formed of a black film member having a light shielding property. As the resin film used for the first plate body 22A, a resin material containing carbon black is used. The light shielding rate of the resin film used for the first plate body 22A is preferably 90% or more based on the measurement method of JIS K7605; 1976. It is more preferable to use a black film having a light shielding rate of 99% or more for the first plate body 22A. Such a first plate body 22A shields measurement light reaching a portion other than the window portion 35. In addition, the first plate body 22A absorbs stray light of measurement light, which would otherwise affect measurement accuracy.

The second plate body 22B, the third plate body 22C, the fourth plate body 22D, and the fifth plate body 22E are made of transparent resin films. The reagent plate 32 is made of a transparent resin plate.

As shown in FIG. 2, the main body portion 16 of the test strip 12 has a first main body portion 16A on the first end portion 12*a* side and a second main body portion 16B on the second end portion 12*b* side. The first main body portion 16A is provided with a configuration necessary for component measurement, such as the flow path 20, the buffer space 26, the introduction port 18, the reagent plate 32, the reagent 32*b*, and the window portion 35. The second main body portion 16B is provided with a held portion 17 for correctly holding the test strip 12 in the component measurement device 14 during measurement. The held portion 17 has engagement portions 36 and a notch 16*c*.

The test strip 12 has the notch 16*c* at the second end portion 12*b*. In addition, the test strip 12 has a pair of engagement portions 36 on both sides in the vicinity of the second end portion 12*b*. The notch 16*c* is formed by cutting out the end surface of the test strip 12 on the second end portion 12*b* side in an arc shape in a plan view. One end of the test strip 12 in the width direction has a first side portion 12*c* extending in the longitudinal direction. The other end of the test strip 12 in the width direction has a second side portion 12*d* extending in the longitudinal direction. The engagement portions 36 are each formed on the first side portion 12*c* and the second side portion 12*d*. The engagement portions 36 are a pair of engagement end surfaces provided at the outer edge of the test strip 12 so as to be symmetric with respect to the longitudinal center axis (center line 12*e*) of the test strip 12 in a plan view.

Each of the engagement portions 36 has a small width portion 38, a convex portion 40, and a concave portion 42 in this order from the second end portion 12*b* toward the first end portion 12*a*. The small width portion 38 is formed at a position closest to the second end portion 12*b* in the engagement portion 36 or at the second end portion 12*b*. The small width portion 38 constitutes at least a part of the outer edge of the second end portion 12*b* together with the notch 16*c*. The small width portion 38 is formed on both outer sides in the width direction of the notch 16*c*. The small width portion 38 is formed linearly in the longitudinal direction. A width W3 sandwiched between the pair of small width portions 38 in the length of the test strip 12 in the width direction is narrower than a maximum width W1 of the main body portion 16.

The convex portion 40 adjacent to the small width portion 38 is formed between the first end portion 12*a* and the small width portion 38. The convex portion 40 gently protrudes outward in the width direction in a plan view as viewed in the thickness direction. The convex portion 40 has a first inclined portion 40*a*, a second inclined portion 40*b*, and a top portion 40*c* (40*c*1, 40*c*2). The first inclined portion 40*a* is located at a position adjacent to the top portion 40*c* between the first end portion 12*a* and the top portion 40*c*. The second inclined portion 40*b* is located at a position adjacent to the top portion 40*c* between the top portion 40*c* and the second end portion 12*b*. The top portion 40*c* is located between the first inclined portion 40*a* and the second inclined portion 40*b*. The first inclined portion 40*a* has an inclined end surface inclined in a direction of expanding outward in the width direction toward the second end portion 12*b*. The second inclined portion 40*b* is formed closer to the second end portion 12*b* side than the top portion 40*c* of the convex portion 40. The second inclined portion 40*b* is an inclined end surface inclined inward in the width direction (that is, the direction in which the width of the test strip 12 is narrowed) as approaching the second end portion 12*b*. The second inclined portion 40*b* is inclined at an angle of 30° or more with respect to the center line 12*e*. More specifically, of angles formed by a straight line obtained by extending the second inclined portion 40*b* in the direction of the second end portion 12*b* and the center line 12*e*, an inclination angle θ formed on the first end portion 12*a* side is 30° or more and 80° or less. More preferably, the second inclined portion 40*b* is inclined by 30° to 45° with respect to the center line 12*e* (that is, 30°<0<45°). The convex portion 40 is connected to the small width portion 38 via the second inclined portion 40*b*. A width W2 between the top portion 40*c*1 of the convex portion 40 of the first side portion 12*c* and the top portion 40*c*2 of the convex portion 40 of the second side portion 12*d* has the same dimension as the width W1 of the main body portion 16.

The concave portion 42 is located between the first main body portion 16A and the convex portion 40 and is a constriction provided continuously with the first main body portion 16A and the protrusion 40, and has a length in the width direction shorter than the width W1 of the first main body portion 16A and the width W2 of the convex portion 40. The convex portion 40 is connected to the main body portion 16 via the concave portion 42.

As shown in FIG. 1A, the component measurement device 14 has a housing 44. The housing 44 has a distal portion 14*a* and a proximal portion 14*b* formed in a semi-circular shape that bulges in a plan view from the thickness direction. An upper surface 44*a* and a lower surface of the housing 44 are formed flatly. The upper surface 44*a* is provided with a display unit that displays a measurement result of a blood glucose level. The distal portion 14*a* of the component measurement device 14 is provided with a lid portion 46. The lid portion 46 slides in a direction perpendicular to the extending direction of the upper surface 44*a*.

An insertion hole 48 into which the test strip 12 is inserted is formed in a side surface of the housing 44 covered with the lid portion 46. The insertion hole 48 is exposed by sliding the lid portion 46. The lid portion 46 also serves as a power switch of the component measurement device 14. When the insertion hole 48 is exposed, the component measurement device 14 is activated.

Figure 4:
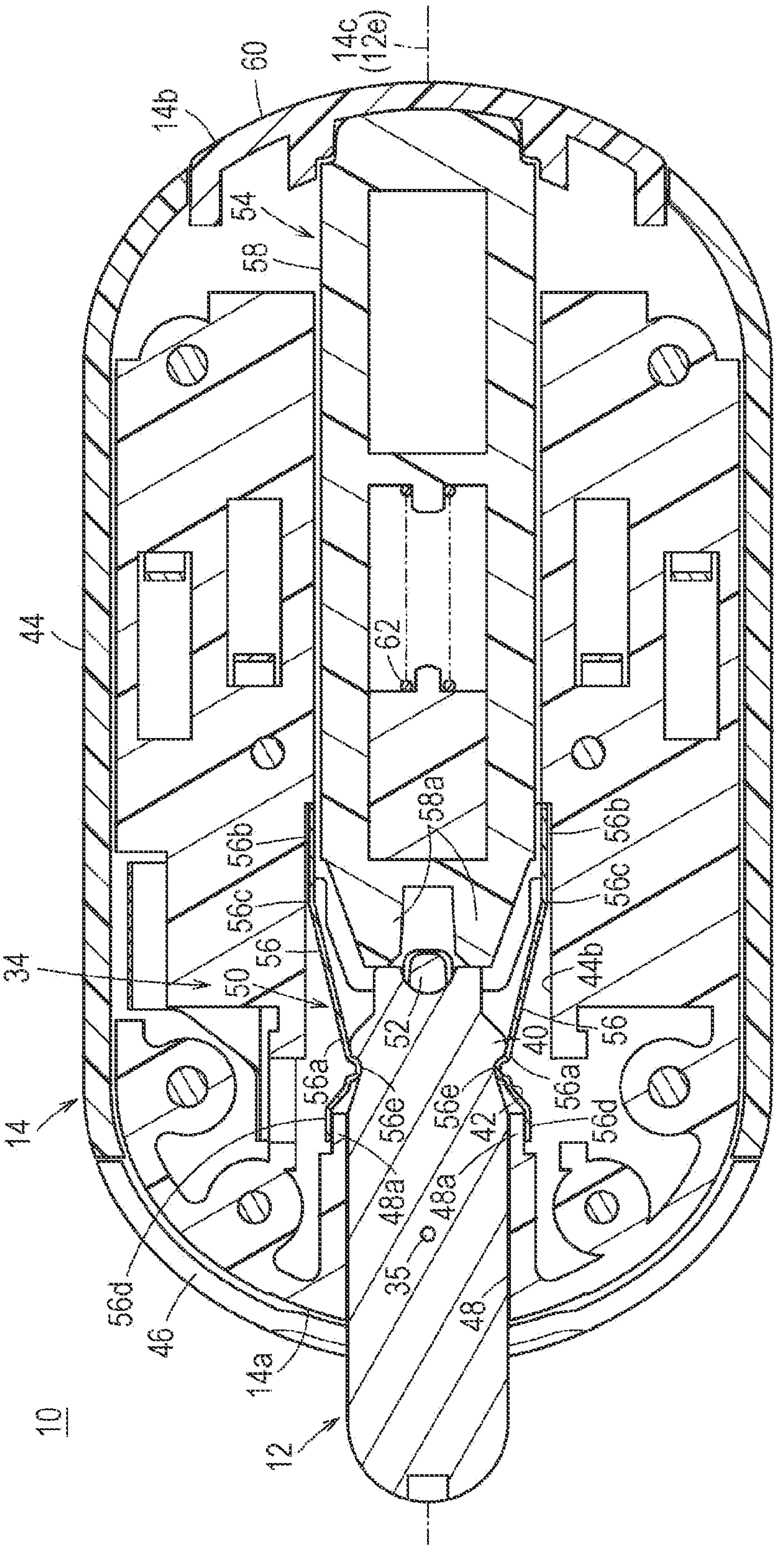
FIG. 4 is a cross-sectional view of the component measurement device in FIG. 1B.

As illustrated in FIG. 4, an insertion hole 48 is provided inside the housing 44 of the component measurement device 14. The insertion hole 48 extends from the distal portion 14*a* toward the proximal portion 14*b* of the housing 44. The dimension in the width direction of the inside of the insertion hole 48 is substantially the same as the width W1 (see FIG. 2) of the main body portion 16 of the test strip 12. In addition, the dimension in the thickness direction inside the insertion hole 48 is substantially the same as the dimension in the thickness direction of the test strip 12. Therefore, the insertion hole 48 accommodates the test strip 12 in the width direction and the thickness direction without rattling. The proximal end of the insertion hole 48 is connected to an internal space 44*b* of the housing 44. The length of the insertion hole 48 in the direction of the center line 14*c* is shorter than the length of the test strip 12 in the longitudinal direction. When the test strip 12 is inserted into the insertion hole 48, the second end portion 12*b* of the test strip 12 is accommodated in the internal space 44*b* via the insertion hole 48.

The housing 44 internally includes a gripping mechanism 50, a receiving portion 52, a discharge mechanism 54, and a measurement unit (not illustrated). The gripping mechanism 50 and the receiving portion 52 are included in a positioning mechanism 34. The gripping mechanism 50 includes a pair of opposing leaf springs 56. The leaf springs 56 are each disposed outside the side portion of the internal space 44*b*, and face each other with respect to the center line 14*c*. The pair of leaf springs 56 holds the test strip 12 from both sides in the width direction of the test strip 12. The leaf spring 56 has a distal portion 56*a* abutting on the test strip 12 and a proximal portion 56*b* joined to an inner wall of the internal space 44*b*. In the leaf spring 56, a bent portion 56*c* is formed between the distal portion 56*a* and the proximal portion 56*b*.

The distance between the center line 14*c* of the internal space 44*b* and the insertion hole 48 and the distal portion 56*a* is shorter than the distance between the center line 14*c* and the proximal portion 56*b*. The distal portion 56*a* has a sliding protrusion 56*e* and a locking portion 56*d*. The locking portion 56*d* is formed at the extreme tip of the distal portion 56*a*. In a state in which the test strip 12 is not inserted into the internal space 44*b*, the locking portion 56*d* abuts on the outside in the width direction of the side wall portion of the insertion hole 48. The locking portion 56*d* prevents the distal portion 56*a* from approaching the center line 14*c*. The locking portion 56*d* abuts on the side wall portion of the insertion hole 48 in a state of being biased toward the center line 14*c* by the elastic restoring force of the leaf spring 56.

Figure 7:
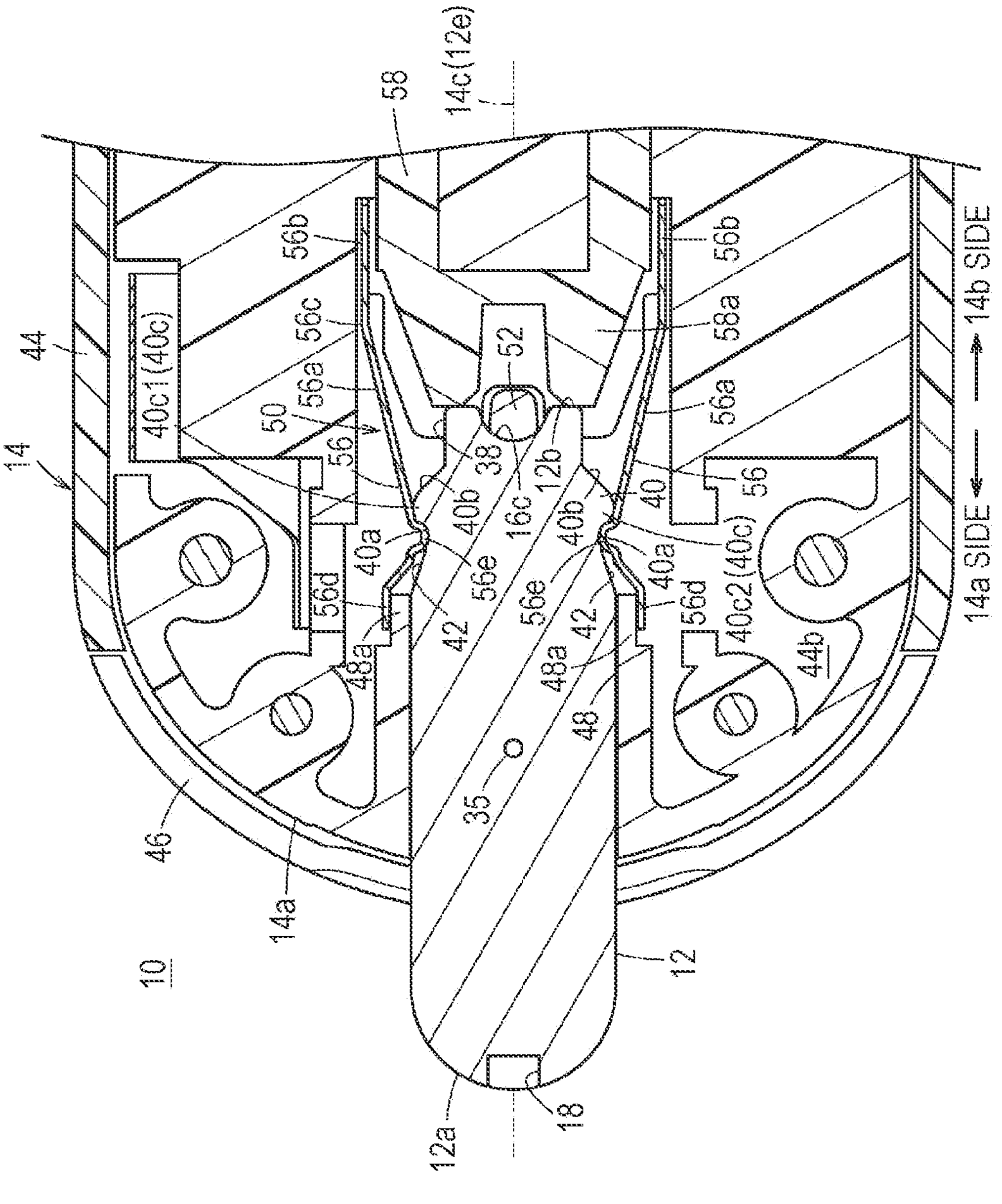
FIG. 7 is a cross-sectional view (part 3) for explaining the action of the component measurement system in FIG. 1B.

The sliding protrusion 56*e* is formed on the proximal side of the locking portion 56*d*. The sliding protrusion 56*e* has an arc shape protruding inward in the width direction in a plan view from the thickness direction of the test strip 12. When the test strip 12 is inserted into the internal space 44*b*, the engagement portion 36 slides between the pair of leaf springs 56 while abutting on the sliding protrusion 56*e*. As illustrated in FIG. 7, the sliding protrusion 56*e* abuts on the first inclined portion 40*a* of the convex portion 40 in the completed state in which the test strip 12 is inserted. In this manner, the sliding protrusion 56*e* biases the test strip 12 toward the proximal portion 14*b* of the housing 44 by the elastic restoring force of the leaf spring 56 and the inclination direction of the first inclined portion 40*a*. That is, the sliding protrusion 56*e* holds the test strip 12 to be drawn into the housing 44. Immediately before the user completes the insertion of the test strip 12, the pair of leaf springs 56 biases the test strip 12 in a direction in which the test strip 12 is drawn into the component measurement device 14, thereby assisting the insertion operation. Thus, the test strip 12 can be reliably guided to a predetermined position.

Figure 6:
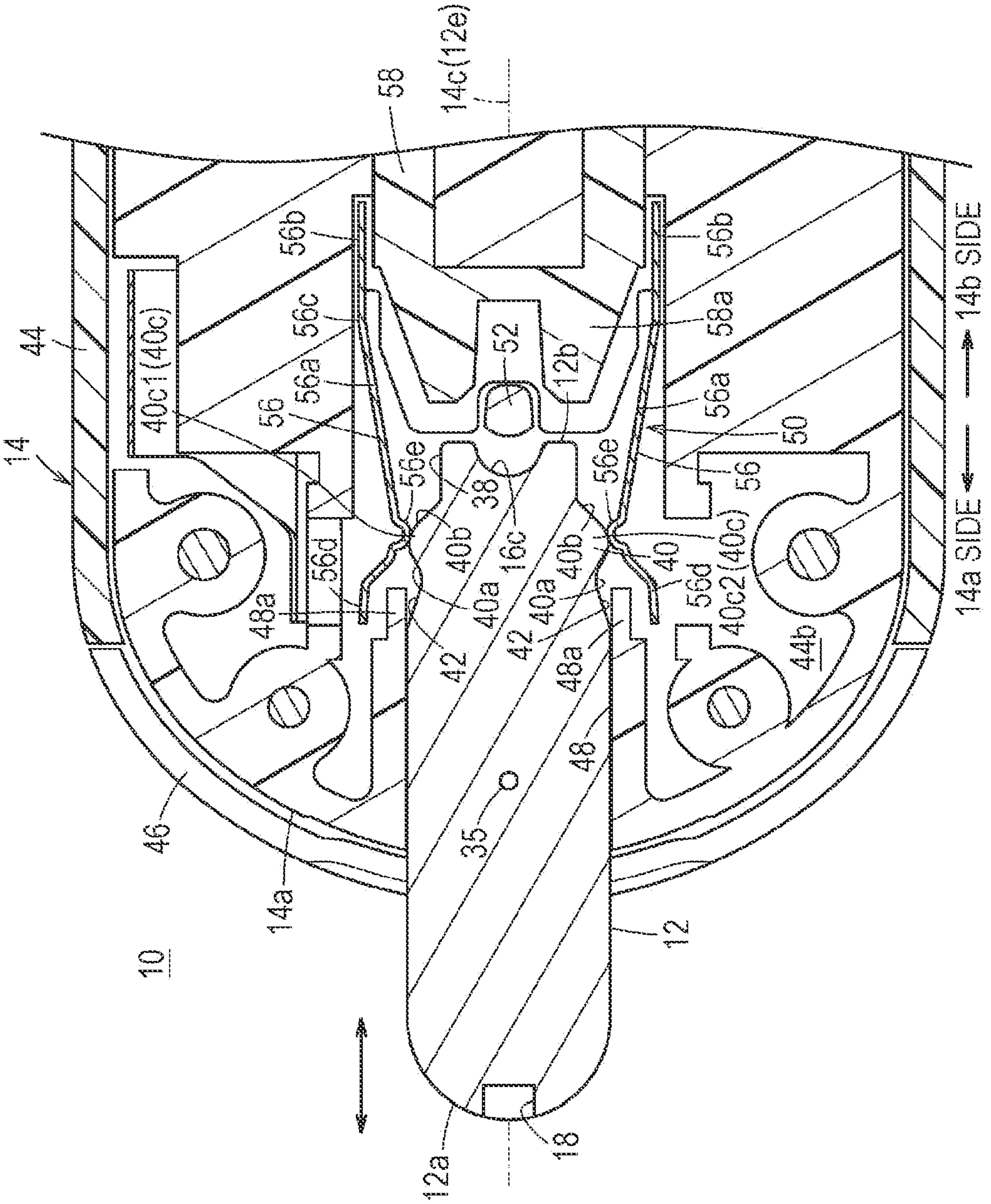
FIG. 6 is a cross-sectional view (part 2) for explaining the action of the component measurement system in FIG. 1B.

As illustrated in FIG. 6, when the test strip 12 is moved in the discharging direction with respect to the housing 44 during the ejecting operation of discharging the test strip 12, the sliding protrusion 56*e* gets over the convex portion 40 from the concave portion 42 to transit to a state of abutting on the second inclined portion 40*b*. In this process, after the sliding protrusion 56*e* gets over the convex portion 40, the sliding protrusion 56*e* biases the test strip 12 toward the distal portion 14*a* of the housing 44 by the elastic restoring force of the leaf spring 56 and the inclination direction of the second inclined portion 40*b*. A biasing force F of the sliding protrusion 56*e* (leaf spring 56) acting on the second inclined portion also acts in a direction in which the test strip 12 is discharged toward the distal portion 14*a* (F sin θ) (see FIG. 9).

The receiving portion 52 is a columnar member extending in the thickness direction of the housing 44. The receiving portion 52 prevents the test strip 12 from moving in the proximal direction (direction of the proximal portion 14*b* side of the housing 44). The outer diameter of the receiving portion 52 is sized to fit into the notch 16*c*. When the test strip 12 is inserted, as illustrated in FIG. 7, the notch 16*c* of the test strip 12 abuts on the receiving portion 52 in a state of being biased by the biasing force F of the sliding protrusion 56*e* and the first inclined portion 40*a*. The receiving portion 52 is fitted to the notch 16*c* to position the second end portion 12*b* of the test strip 12 in the width direction and the longitudinal direction.

As illustrated in FIG. 4, the discharge mechanism 54 includes a pressing piece 58 and an eject button 60 for operating the pressing piece 58. The pressing piece 58 extends in the vicinity of the proximal portion 14*b* along the center line 14*c* of the housing 44 and the insertion hole 48. The eject button 60 is exposed on the outer surface of the proximal portion 14*b* of the housing 44. The eject button 60 is operatively connected to the pressing piece 58 inside the housing 44. When the user presses the eject button 60 toward the distal portion 14*a*, the eject button 60 and the pressing piece 58 are displaced toward the distal portion 14*a*.

Two pressing portions 58*a* are provided at the tip of the pressing piece 58. The pressing portion 58*a* can move toward the insertion hole 48 during the ejection operation to push out the test strip 12 toward the distal portion 14*a* of the housing 44. A coil spring 62 is attached to the inside of the pressing piece 58 in the longitudinal direction. The coil spring 62 biases the pressing piece 58 and the eject button 60 toward the proximal portion 14*b*. When the eject button 60 is pressed with a force larger than the resilient force of the coil spring 62, the eject button 60 and the pressing piece 58 are displaced toward the distal portion 14*a*. In a state in which the eject button 60 is not pressed, the distal end surface of the pressing portion 58*a* of the pressing piece 58 is located on the proximal side of the receiving portion 52. Therefore, the pressing portion 58*a* is separated from the test strip 12 except during the ejecting operation.

In the eject operation, the pressing portion 58*a* pushes out the test strip 12 toward the distal portion 14*a*. As a result, as illustrated in FIG. 6, the sliding protrusion 56*e* of the leaf spring 56 gets over the convex portion 40 of the test strip 12. The elastic restoring force of the leaf spring 56 accelerates the test strip 12 toward the distal portion 14*a* while sliding the sliding protrusion 56*e* on the second inclined portion 40*b*. As a result, as shown in FIG. 5, the test strip 12 is discharged from the insertion hole 48 at a predetermined speed.

Although not particularly illustrated, the component measurement device 14 includes a measurement unit including an irradiation unit that irradiates a portion corresponding to the window portion 35 of the test strip 12 with measurement light and a light receiving unit. The measurement unit detects a blood glucose level from a detection value of the light receiving unit, and displays the detection result on the upper surface 44*a*.

The component measurement system 10 will be described.

Figure 5:
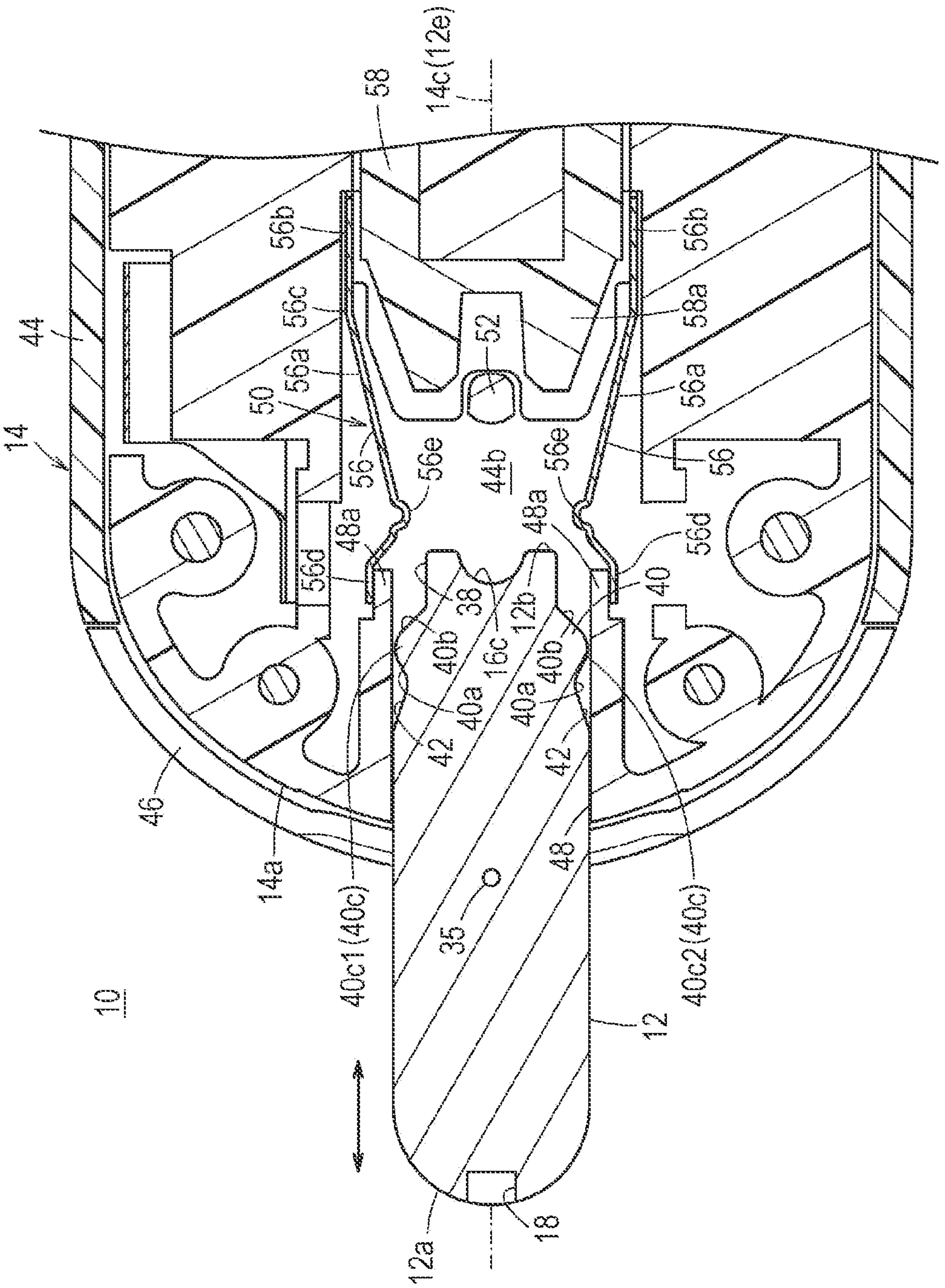
FIG. 5 is a cross-sectional view (part 1) for explaining an action of the component measurement system in FIG. 1B.

As illustrated in FIG. 5, the user inserts the test strip 12 into the insertion hole 48 from the second end portion 12*b* side of the test strip 12. The test strip 12 is inserted into the internal space 44*b* toward the proximal side. In a state in which at least a part of the convex portion 40 of the engagement portion 36 is along the side wall of the internal space 44*b*, the locking portion 56*d* of the leaf spring 56 is in a state of being held to abut on the outer side in the width direction of the proximal end (stopper 48*a*) of the side wall of the insertion hole 48. At this time, the leaf spring 56 does not abut on the small width portion 38 of the engagement portion 36 of the test strip 12. In addition, in a plan view, the engagement portion 36 of the test strip 12 is inserted between the gripping mechanisms 50 having the pair of leaf springs 56. In this manner, a displaceable range of the leaf spring 56 in the width direction is restricted by the locking portion 56*d* and the proximal end of the side wall of the insertion hole 48.

As shown in FIG. 6, when the test strip 12 is further inserted, firstly, the second inclined portion 40*b* of the convex portion 40 of the engagement portion 36 abuts on the sliding protrusion 56*e*. The convex portion 40 pushes and spreads the leaf spring 56 outward in the width direction. More specifically, a contact position between the sliding protrusion 56*e* and the engagement portion 36 moves from the second inclined portion 40*b* toward the top portion 40*c* as the test strip 12 is inserted. The distance between the pair of sliding protrusions 56*e* increases from the length between the second inclined portions 40*b* facing each other in the test strip 12 depending on the length (W2) between the facing top portions 40*c* (40*c*1, 40*c*2). When the test strip 12 is inserted to the proximal side, the sliding protrusion 56*e* of the leaf spring 56 gets over the top portion 40*c*, and the sliding protrusion 56*e* abuts on the first inclined portion 40*a* of the convex portion 40 (FIGS. 4 and 7). By the inclination direction of the first inclined portion 40*a* and the biasing force F of the sliding protrusion 56*e*, the test strip 12 is biased so as to be drawn toward the proximal portion 14*b*. As a result, the notch 16*c* of the second end portion 12*b* of the test strip 12 is fitted into the receiving portion 52.

As described above, the component measurement device 14 grips the test strip 12 and positions it at a predetermined position. Since the component measurement device 14 grips the test strip 12 without pressing it in the thickness direction, it is possible to suppress deformation in the thickness direction of the flow path 20 (see FIG. 3) inside the test strip 12. As a result, the component measurement device 14 can prevent the variation in an optical path length of the measurement light of the test strip 12, and can suppress a measurement error.

After the measurement is completed (FIG. 7), the user performs an operation to push out the eject button 60 illustrated in FIG. 4. As a result, the test strip 12 is pushed out toward the distal portion 14*a* and is separated from the component measurement device 14.

As the eject button 60 is pressed, the pressing piece 58 abuts on the proximal end of the test strip 12 (FIG. 7) to push out the test strip 12 in the discharge direction (the direction of the distal portion 14*a* side). The test strip 12 is moved in the direction of the distal portion 14*a* side by the pressing piece 58. As a result, the portion where the sliding protrusion 56*e* and the engagement portion 36 abut on each other moves from the first inclined portion 40*a* to the position beyond the top portion 40*c*. The moving length of the pressing piece 58 in the longitudinal direction necessary for discharging the test strip 12 is equal to or longer than the displacement amount of the sliding protrusion 56*e* in the longitudinal direction from the first inclined portion 40*a* to the position beyond the top portion 40*c*.

Next, as shown in FIG. 6, the position where the sliding protrusion 56*e* and the engagement portion 36 abut on each other moves to a position where the sliding protrusion gets over the top portion 40*c* to abut on the second inclined portion 40*b*. After getting over the top portion 40*c*, the test strip 12 is biased so as to be pushed out toward the distal portion 14*a* side by the biasing force F toward the inside in the width direction of the leaf spring 56 and the second inclined portion 40*b* inclined toward the proximal portion 14*b* side (that is, the length in the width direction of the test strip 12 becomes narrower toward the proximal portion 14*b*), and is discharged. While the sliding protrusion 56*e* is abutting on at least a part of the top portion 40*c* and the second inclined portion 40*b*, the locking portion 56*d* is separated from the side wall portion of the insertion hole 48. The sliding protrusion 56*e* reaches the second inclined portion 40*b*, and the biasing force F in the discharge direction is applied to the test strip 12. When the abutment state between the sliding protrusion 56*e* and the engagement portion 36 of the test strip 12 is released, the sliding protrusion 56*e* separates from the test strip 12. Thereafter, the leaf spring 56 transitions to a state in which the locking portion 56*d* abuts on the outer side of the insertion hole 48 in the proximal portion width direction by the restoring force of the leaf spring 56 itself (FIG. 5).

The length between the pair of locking portions 56*d* facing each other is restricted by the side wall of the proximal portion of the insertion hole 48. In this way, a displacement range of the leaf spring 56 is restricted, and thus, immediately before the test strip 12 is locked to the leaf spring 56 and immediately after the test strip 12 is separated from the holding state by the leaf spring 56, a pair of sliding protrusions 56*e* facing each other is prevented from coming into contact with the small width portion 38. Therefore, the pair of locking portions 56*d* facing each other and the side wall end portions on both sides in the width direction of the proximal portion of the insertion hole 48 prevent an occurrence of frictional resistance due to a contact of the sliding protrusion 56*e* with the small width portion 38 during the insertion and removal of the test strip 12 into and from the component measurement device 14, and enable a smooth ejection operation.

Hereinafter, examples and comparative examples of the test strip 12 will be described. The test strip 12 is formed by laminating a plurality of resin films and punching the laminate with a punching die. Therefore, there is a possibility that an adhesive component having a relatively large frictional resistance is exposed at the engagement portions 36 of the side portions 12*c* and 12*d* of the test strip 12. In such a case, even if the biasing force F of the leaf spring 56 is appropriately adjusted, the test strip 12 may not be smoothly discharged from the component measurement device 14. When the biasing force F of the leaf spring 56 is too high, it is difficult to insert the test strip 12. Therefore, the inventors of the present application have studied the shape of the test strip 12.

Figure 8A:
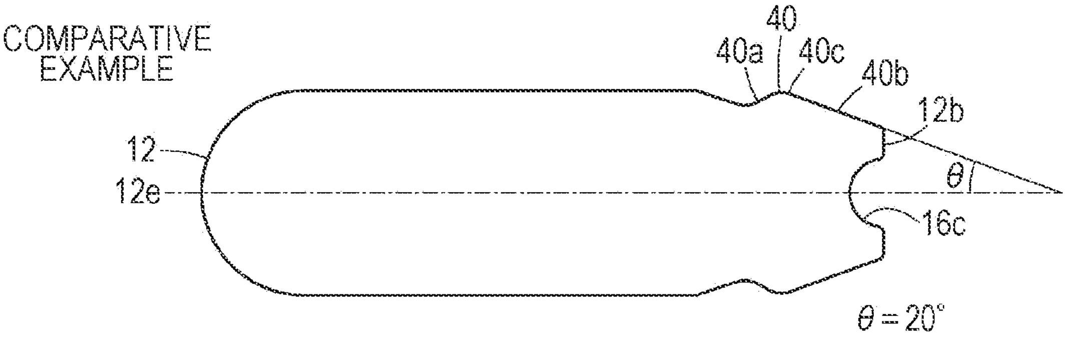
FIG. 8A is a plan view of a test strip according to a comparative example.

A test strip 12 according to the comparative example shown in FIG. 8A has an engagement portion 36 having a convex portion 40 in the vicinity of a second end portion 12*b*. The convex portion 40 of the comparative example has a second inclined portion 40*b* extending linearly to the second end portion 12*b* of the test strip 12. An angle (an acute angle) between a virtual extension line obtained by extending the second inclined portion 40*b* of the comparative example toward a proximal side and a center line 12*e* of the test strip 12 is That is, in the comparative example, the second inclined portion 40*b* is inclined outward by 20° in the width direction with respect to the center line 12*e* toward a distal end side.

Figure 8B:
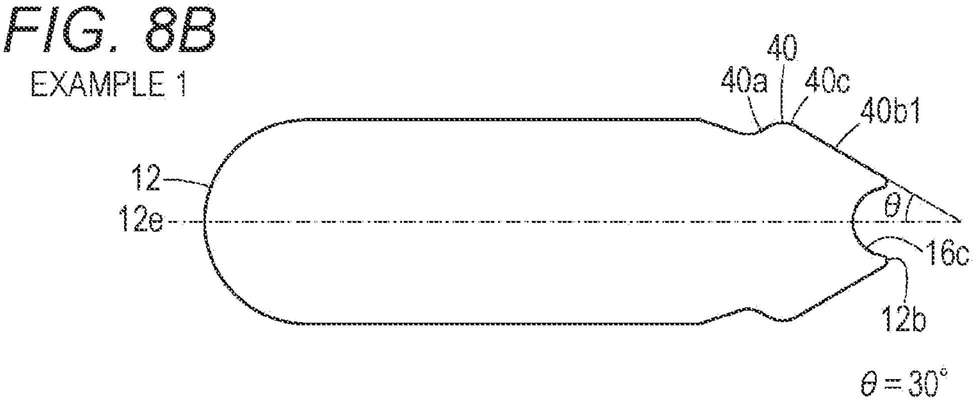
FIG. 8B is a plan view of a test strip according to Example 1.

A test strip 12 according to Example 1 shown in FIG. 8B has an engagement portion 36 having a convex portion 40 in the vicinity of a second end portion 12*b*. The convex portion 40 of Example 1 has a second inclined portion 40*b*1 extending linearly to the second end portion 12*b* of the test strip 12. An angle (an acute angle) between a virtual extension line obtained by extending the second inclined portion 40*b*1 of Example 1 toward a proximal side and a center line 12*e* of the test strip 12 is 30°. That is, in Example 1, the second inclined portion 40*b*1 is inclined outward by 30° in the width direction with respect to the center line 12*e* toward a distal end side.

Figure 8C:
FIG. 8C is a plan view of a test strip according to Example 2.

A test strip 12 according to Example 2 shown in FIG. 8C has an engagement portion 36 having a convex portion 40 in the vicinity of a second end portion 12*b*. The convex portion 40 of Example 2 has a second inclined portion 40*b*2 extending linearly to the second end portion 12*b* of the test strip 12. An angle (an acute angle) between a virtual extension line obtained by extending the second inclined portion 40*b*2 of Example 2 toward a proximal side and a center line 12*e* of the test strip 12 is 33°. That is, in Example 2, the second inclined portion 40*b*2 is inclined outward by 33° in the width direction with respect to the center line 12*e* toward a distal end side.

Figure 8D:
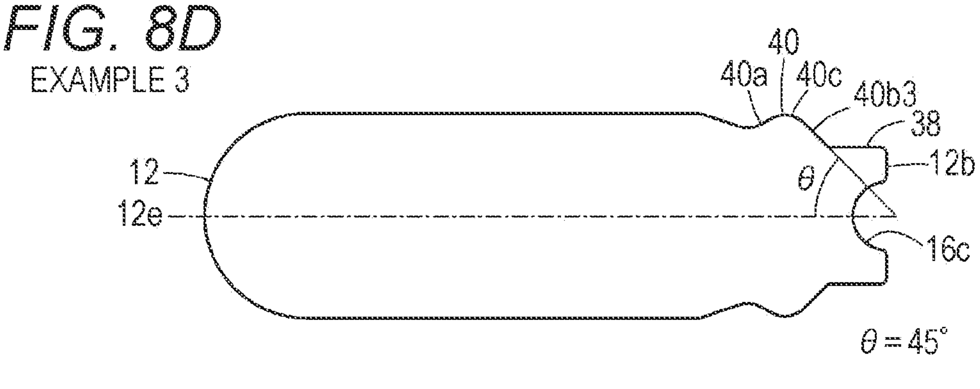
FIG. 8D is a plan view of a test strip according to Example 3.

A test strip 12 according to Example 3 illustrated in FIG. 8D has the same configuration as that described with reference to FIGS. 2 to 7. An angle (an acute angle) between a virtual extension line obtained by extending a second inclined portion 40*b*3 of the test strip 12 toward a proximal side and a center line 12*e* of the test strip 12 is 45°. That is, in Example 3, the second inclined portion 40*b*3 is inclined outward by 45° in the width direction with respect to the center line 12*e* toward a distal end side.

Figure 9:
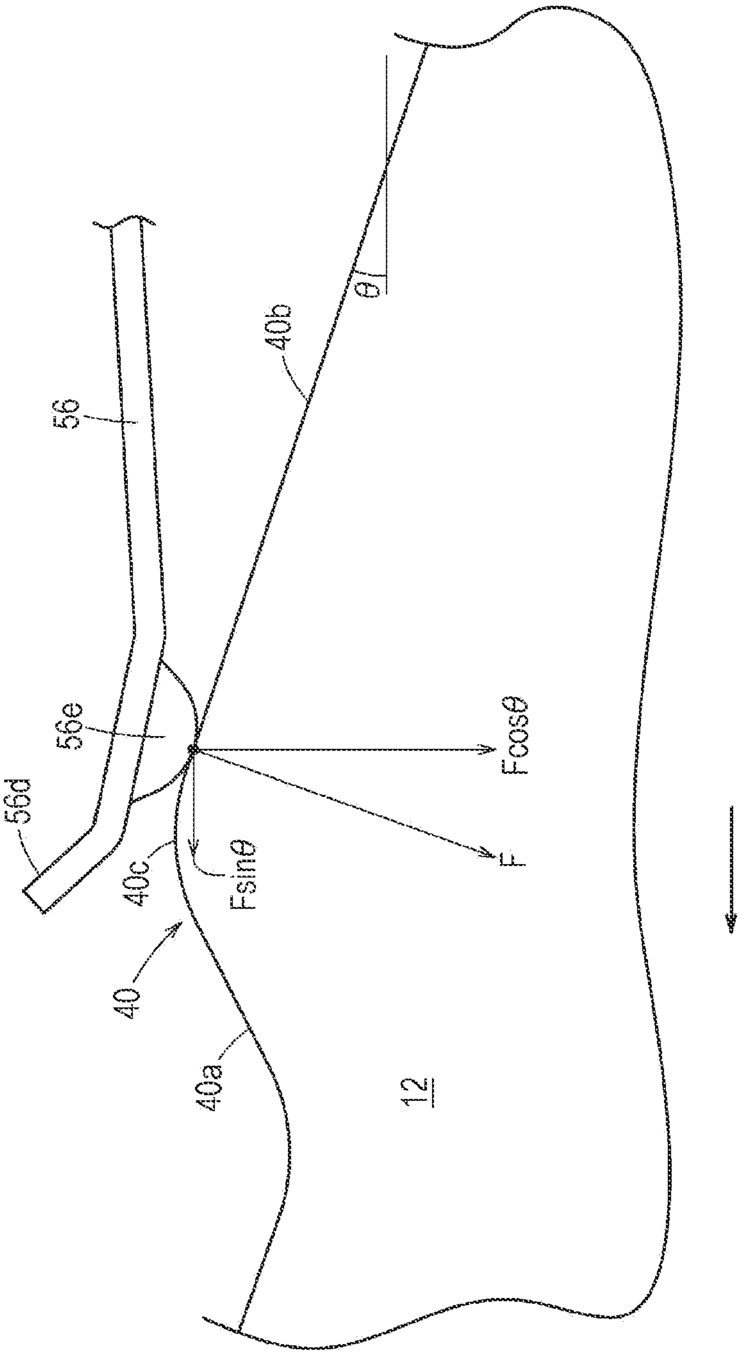
FIG. 9 is an explanatory view illustrating an inclination angle θ of a second inclined portion of an engagement portion of a test strip and a biasing force acting on the test strip by a leaf spring of a gripping mechanism.

As illustrated in FIG. 9, when a biasing force F of a leaf spring 56 acts on a second inclined portion 40*b* of a test strip 12, a propulsive force of F×sin θ acts on a second inclined portion 40*b* having an inclination angle θ toward a distal end side.

Figure 10:
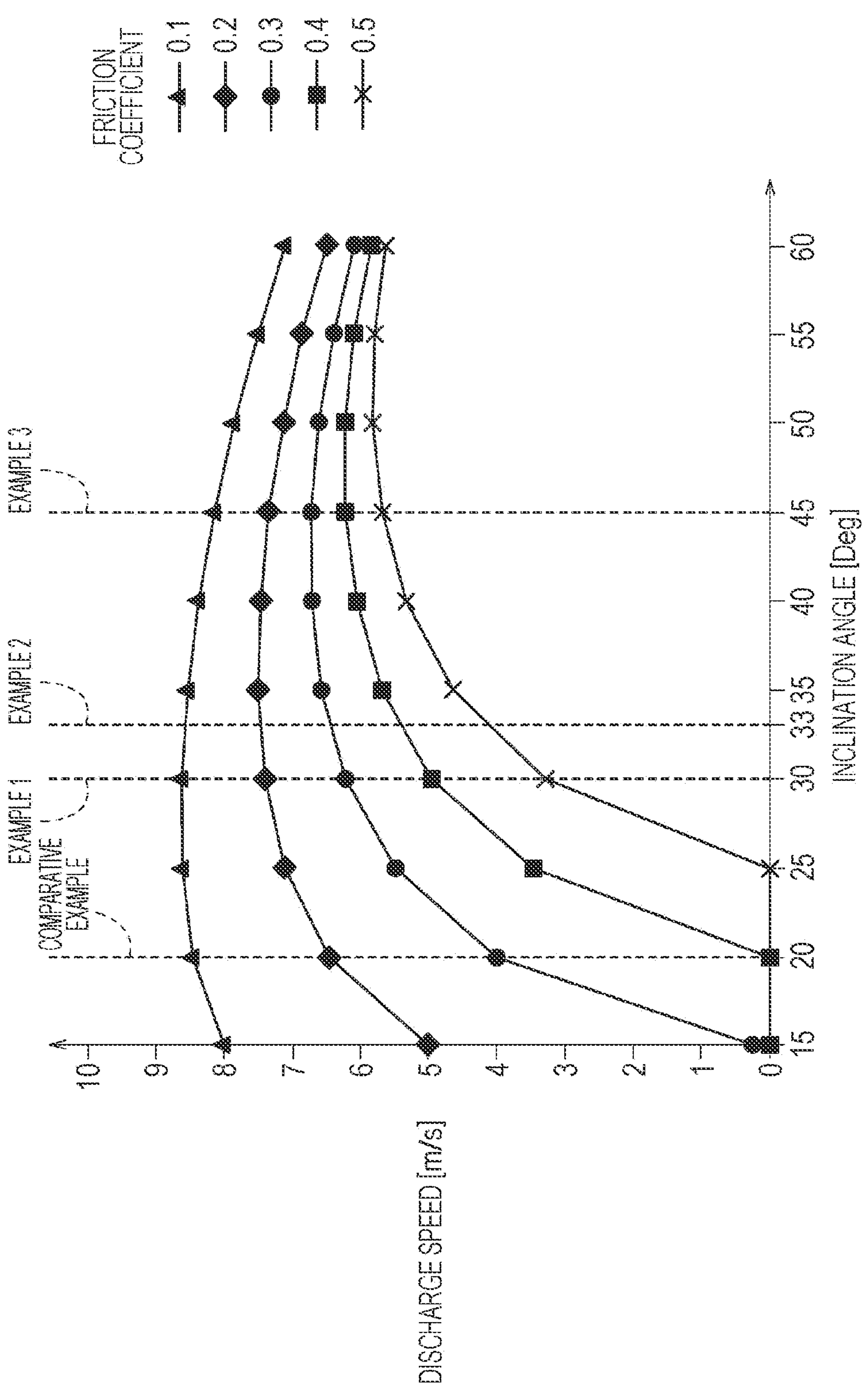
FIG. 10 is a graph showing a result obtained by calculating a relationship between the inclination angle θ of the second inclined portion of the test strip and a discharge speed of the test strip.

Therefore, as shown in FIG. 10, the inventors obtained the discharge speed of the test strip 12 when the inclination angle θ and the friction coefficient of the second inclined portion 40*b* of the test strip 12 were changed for the comparative example and each example. A friction coefficient of 0.1 represents a friction coefficient of the ideal second inclined portion 40*b*. A friction coefficient of 0.5 represents a friction coefficient in a state in which the exposure amount of the adhesive having adhesiveness is large in the second inclined portion 40*b*.

In the case of a friction coefficient of 0.5, when an inclination angle of the second inclined portion 40*b* is 25° or less, the discharge speed of the test strip 12 is 0. In this case, an initial speed cannot be applied to the test strip 12, and the test strip 12 fails in discharge. On the other hand, as in Examples 1 to 3, when an inclination angle of the second inclined portion 40*b* is 30° or more, the test strip 12 can be discharged from the component measurement device 14 at a speed of 3 msec or more. That is, when an inclination angle of the second inclined portion 40*b* is 30°, the test strip 12 is reliably discharged even when the adhesive is exposed to the side portions 12*c* and 12*d* of the test strip 12.

Next, as shown in FIG. 11, the inventors confirmed the discharging operation of the test strip 12 of Examples 1 to 3 using the component measurement device 14. As a determination criterion, when the component measurement device 14 to which the test strip 12 is attached is discharged so that the insertion hole 48 opens downward, it is determined that the discharge succeeds when the second inclined portion 40*b* of the test strip 12 is discharged at a predetermined speed or more without being caught by the leaf spring 56 or the insertion hole 48. The inventors prepared 100 test strips 12 for each of Examples 1 to 3 and performed an operation test. As shown, the component measurement device 14 successfully ejected all the test strips 12 of Examples 1 to 3. As described above, by setting the inclination angle of the second inclined portion 40*b* to 30° or more, the test strip 12 can be reliably discharged. As a result, the user can discard the test strip 12 without touching it after use to which blood is attached. In addition, the test strip 12 having a thin plate shape is discharged from the component measurement device 14 at an initial speed to some extent, so that it can be reliably put into a disposal box. Furthermore, when the test strip 12 is inserted, the test strip 12 can be inserted at a correct position without being bent or warped, which is also preferable for measurement.

The component measurement system 10 and the component measurement device 14 described above have the following effects.

A component measurement system 10 of the present embodiment includes: a test strip 12 having a main body portion 16 with a thin plate shape, a flow path 20 that is formed inside the main body portion 16 and extends from a first end portion 12*a* toward an opposite second end portion 12*b* in a longitudinal direction of the main body portion 16 and stores a liquid, and an introduction port 18 provided at the first end portion 12*a*; and a component measurement device 14 that stores the test strip 12 and detects a component in the liquid. The component measurement device 14 of the component measurement system 10 includes: a housing 44 having a distal portion 14*a* and a proximal portion 14*b*; an insertion hole 48 that is provided inside the housing 44 and accommodates the test strip 12; a measurement unit that detects a target component in a liquid in at least a part of the flow path 20 in a state in which the test strip 12 is completely accommodated in the insertion hole 48; and a positioning mechanism 34 that maintains an insertion position of the test strip 12. The positioning mechanism 34 includes a gripping mechanism 50 that is provided between the insertion hole 48 and the proximal portion of the housing 44 and grips the test strip 12 while biasing the test strip 12 from the width direction.

In the above component measurement system 10, the direction in which the gripping mechanism 50 biases the test strip 12 is a direction orthogonal to the transmission direction of the measurement light and is a width direction of the test strip 12. Therefore, even when the test strip 12 is gripped by the gripping mechanism 50, the flow path 20 is not deformed in the thickness direction, so that the length of the optical path through which the measurement light is transmitted is not changed. As a result, the component measurement system 10 can accurately measure a concentration of a target component.

In the above component measurement system 10, the gripping mechanism 50 includes a pair of opposing leaf springs 56. The component measurement system 10 can realize the positioning mechanism 34 with a simple device configuration.

In the component measurement system 10 described above, the test strip 12 has an engagement portion 36 that abuts the gripping mechanism 50. The gripping mechanism 50 abuts on the first inclined portion 40*a* of the engagement portion 36 to bias the test strip 12 toward the proximal portion of the housing 44. The first inclined portion 40*a* is inclined with respect to the longitudinal center axis 12*e* of the test strip 12 in a direction of expanding outward in the width direction of the test strip 12 toward the second end portion 12*b*. The component measurement system 10 positions the test strip 12 in a biased state, so that the test strip 12 can be prevented from rattling in the component measurement device 14 during measurement.

In the component measurement system 10 described above, the positioning mechanism 34 has a receiving portion 52 that abuts on the second end portion 12*b* of the test strip 12. The gripping mechanism 50 causes the test strip 12 to abut on the receiving portion 52, so that the test strip 12 is positioned in the longitudinal direction. This component measurement system 10 allows more accurate positioning of the test strip 12.

In the component measurement system 10 described above, the component measurement device 14 has a discharge mechanism 54 that pushes out the test strip 12 toward the distal portion of the housing 44. The component measurement system 10 can smoothly discharge the test strip 12 without contacting it after use.

In the component measurement system 10 described above, the engagement portion 36 of the test strip 12 has a second inclined portion 40*b* between the first inclined portion 40*a* and the second end portion 12*b*, with the width of the second inclined portion 40*b* decreasing toward the second end portion 12*b*. The gripping mechanism 50 biases the test strip inward in the width direction while abutting on the second inclined portion 40*b*, thereby biasing the test strip 12 toward the first end portion 12*a* with respect to the component measurement device 14. This component measurement system 10 can smoothly discharge the test strip 12.

In the component measurement system 10 described above, the second inclined portion 40*b* of the test strip 12 is inclined by 30° or more with respect to the longitudinal center axis 12*e* of the test strip 12. The component measurement system 10 can reliably discharge the test strip 12 even if the adhesive is exposed to the side portions 12*c* and 12*d* of the test strip 12. That is, even if the side portions 12*c* and 12*d* of the test strip 12 are processed as normal cut sections, the test strip 12 can be reliably discharged from the component measurement device 14. As a result, it is not necessary to perform special processing on the side portions 12*c* and 12*d* of the test strip 12.

In the component measurement system 10 described above, the component measurement device 14 includes the stopper 48*a* that restricts a displacement range inward in the width direction of the pair of opposing leaf springs 56 of the gripping mechanism 50, and the tips of the pair of opposing leaf springs 56 are held on both sides in the width direction of the stopper 48*a* in a state in which the test strip 12 is not inserted. The component measurement system 10 can limit a displacement range of the leaf spring 56 while increasing the biasing force F of the leaf spring 56.

In the component measurement system 10 described above, the test strip 12 has the second inclined portion 40*b* separated from the second end portion 12*b*. A small width portion 38 formed with a constant width is provided between the second inclined portion 40*b* and the second end portion 12*b*. The side portion of the small width portion 38 is disposed in a range not abutting on the gripping mechanism 50. The component measurement system 10 can prevent the test strip 12 from decelerating due to the contact between the small width portion 38 and the leaf spring 56, and can smoothly discharge the test strip 12.

A component measurement device 14 of the present embodiment is a component measurement device 14 used in a component measurement system 10 that detects a component in a liquid using a test strip 12 including: a main body portion 16 having a thin plate shape; a flow path 20 that is formed inside the main body portion 16, extends from a first end portion 12*a* toward an opposite second end portion 12*b* in a longitudinal direction of the main body portion 16, and stores the liquid; and an introduction port 18 provided at the first end portion 12*a*. The component measurement device 14 includes: a housing 44 having a distal portion 14*a* and a proximal portion 14*b*; an insertion hole 48 that is provided inside the housing 44 and accommodates the test strip 12; a measurement unit that detects a component in a liquid in at least a part of the flow path 20 in a state in which the test strip 12 is completely accommodated in the insertion hole 48; and a positioning mechanism 34 that maintains an insertion position of the test strip 12. The positioning mechanism 34 includes a gripping mechanism 50 that is provided between the insertion hole 48 and the proximal portion 14*b* of the housing 44 and grips the test strip 12 while biasing the test strip 12 in the width direction. The component measurement device 14 can accurately detect a component in a liquid.

Note that the present invention is not limited to the above-described embodiments, and various configurations can be adopted without departing from the gist of the present invention.

The invention claimed is:

1. A component measurement system comprising:
   - a test strip comprising:
     - a main body portion with a thin plate shape,
     - a flow path that is formed inside the main body portion, extends from a first end portion toward an opposite second end portion in a longitudinal direction of the main body portion, and accommodates a liquid, and
     - an introduction port located at the first end portion;
   - a component measurement device comprising:
     - a housing having a distal portion and a proximal portion,
     - an insertion hole that is located inside the housing and configured to accommodate the test strip,
     - a measurement unit configured to detect a target component in the liquid in at least a part of the flow path in a state in which the test strip is completely accommodated in the insertion hole, and a positioning mechanism configured to maintain an insertion position of the test strip, the positioning mechanism comprising a gripping mechanism that is located between the insertion hole and the proximal portion of the housing and is configured to grip the test strip while biasing the test strip from a width direction, the gripping mechanism comprising a pair of opposing leaf springs; and a discharge mechanism configured to push out the test strip toward the distal portion of the housing, wherein:

the test strip comprises an engagement portion that abuts on the gripping mechanism, the gripping mechanism abuts on a first inclined portion of the engagement portion to bias the test strip toward the proximal portion of the housing, the first inclined portion is inclined with respect to a longitudinal center axis of the test strip in a direction of expanding outward in the width direction of the test strip toward the second end portion, the engagement portion of the test strip comprises a second inclined portion between the first inclined portion and the second end portion, with a width of the second inclined portion decreasing toward the second end portion, and the gripping mechanism is configured to bias the test strip inward in the width direction while abutting on the second inclined portion, to bias the test strip toward the first end portion with respect to the component measurement device.

2. The component measurement system according to claim 1, wherein:

the positioning mechanism comprises a receiving portion that abuts on the second end portion of the test strip, and the gripping mechanism is configured to cause the test strip to abut on the receiving portion, so that the test strip is positioned in the longitudinal direction.

3. The component measurement system according to claim 1, wherein:

the second inclined portion of the test strip is inclined by 30° or more with respect to the longitudinal center axis of the test strip.

4. The component measurement system according to claim 3, further comprising:

a stopper configured to restrict a displacement range inward in the width direction of the pair of opposing leaf springs of the gripping mechanism, wherein:

tips of the pair of opposing leaf springs are held on both sides in the width direction of the stopper in a state in which the test strip is not inserted.

5. The component measurement system according to claim 4, wherein:

the test strip comprises a small width portion in which the second inclined portion is separated from the second end portion and formed to have a constant width between the second inclined portion and the second end portion, and a side portion of the small width portion is disposed in a range not abutting on the gripping mechanism.

6. A component measurement device for use in a component measurement system comprising a test strip comprising a main body portion with a thin plate shape, a flow path that is formed inside the main body portion, extends from a first end portion toward an opposite second end portion in a longitudinal direction of the main body portion, and accommodates a liquid, and an introduction port located at the first end portion, the component measurement device comprising:

a housing having a distal portion and a proximal portion, an insertion hole that is located inside the housing and configured to accommodate the test strip, a measurement unit configured to detect a component in the liquid in at least a part of the flow path in a state in which the test strip is completely accommodated in the insertion hole, a positioning mechanism configured to maintain an insertion position of the test strip, the positioning mechanism comprising a gripping mechanism that is located between the insertion hole and the proximal portion of the housing and is configured to grip the test strip while biasing the test strip in a width direction, the gripping mechanism comprising a pair of opposing leaf springs, and a discharge mechanism configured to push out the test strip toward the distal portion of the housing, wherein:

the gripping mechanism abuts on an engagement portion of the test strip, the gripping mechanism abuts on a first inclined portion of the engagement portion to bias the test strip toward the proximal portion of the housing, the first inclined portion inclined with respect to a longitudinal center axis of the test strip in a direction of expanding outward in the width direction of the test strip toward the second end portion, and the gripping mechanism abuts on a second inclined portion of the engagement portion to bias the test strip inward in the width direction, to bias the test strip toward the first end portion with respect to the component measurement device, the second inclined portion positioned between the first inclined portion and the second end portion, with a width of the second inclined portion decreasing toward the second end portion.

7. A component measurement system comprising:

a test strip comprising:

a main body portion with a thin plate shape, a flow path that is formed inside the main body portion, extends from a first end portion toward an opposite second end portion in a longitudinal direction of the main body portion, and accommodates a liquid, and an introduction port located at the first end portion;

a component measurement device configured to detect a component in the liquid, the component measurement device comprising:

a housing having a distal portion and a proximal portion, an insertion hole that is located inside the housing and configured to accommodate the test strip, and a positioning mechanism configured to maintain an insertion position of the test strip, the positioning mechanism comprising a pair of opposing leaf springs that is located between the insertion hole and the proximal portion of the housing and is configured to grip the test strip while biasing the test strip from a width direction, and a discharge mechanism configured to push out the test strip toward the distal portion of the housing, wherein:

the test strip comprises an engagement portion that abuts on the pair of opposing leaf springs, the pair of opposing leaf springs abuts on a first inclined portion of the engagement portion to bias the test strip toward the proximal portion of the housing, the first inclined portion is inclined with respect to a longitudinal center axis of the test strip in a direction of expanding outward in the width direction of the test strip toward the second end portion, the engagement portion of the test strip comprises a second inclined portion between the first inclined portion and the second end portion, with a width of the second inclined portion decreasing toward the second end portion, and the pair of opposing leaf springs is configured to bias the test strip inward in the width direction while abutting on the second inclined portion, to bias the test strip toward the first end portion with respect to the component measurement device.

* * * * *